(No Model.)
H. TALLMAN.
DOUBLE DISK HARROW.
No. 525,368. Patented Sept. 4, 1894.
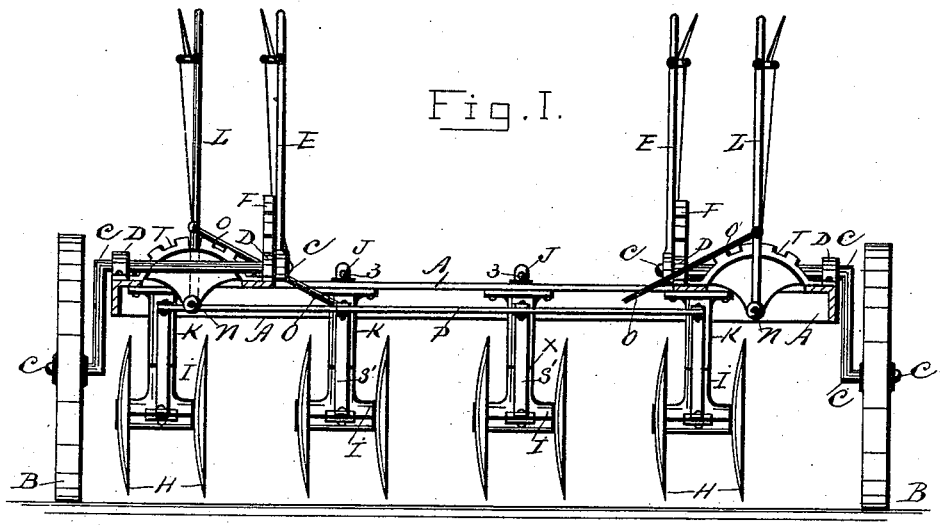
Fig. I.
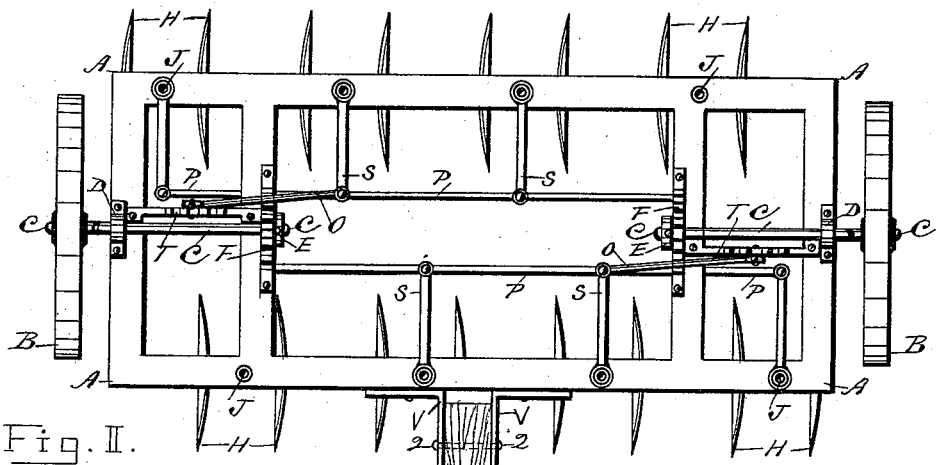
Fig. II.
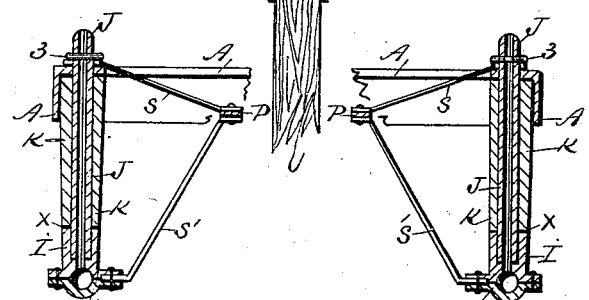
Fig. III.
Witnesses:
Inventor:
Hervey Tallman
By his Atty. John H. Hendry.
THE NORRIS PETERS CO., PHOTO-LITHO., WASHINGTON, D. C.

UNITED STATES PATENT OFFICE.

HERVEY TALLMAN, OF BEAMSVILLE, CANADA.

DOUBLE-DISK HARROW.

SPECIFICATION forming part of Letters Patent No. 525,368, dated September 4, 1894.

Application filed November 24, 1893. Serial No. 491,850. (No model.) Patented in Canada October 17, 1893, No. 44,504.

*To all whom it may concern:*

Be it known that I, HERVEY TALLMAN, a subject of the Queen of Great Britain, residing at Beamsville, in the county of Lincoln and Province of Ontario, Canada, have invented a new and useful Double-Disk Harrow, (for which I have obtained a patent in Canada, No. 44,504, bearing date October 17, 1893,) of which the following is a specification.

My invention relates to improvements in adjustable double disk harrow machines, in which a forward, and rear section of double disks are suspended from the frame of the machine, and capable of being lowered into or elevated from the ground; these disks are also capable of adjustment to different angles from the line of draft, by means of mechanism.

The objects of my improvements are, first, to provide a double and adjustable disk harrow, that shall be capable of light or of deep cutting, to ridge up the ground for seeding, to hollow or level, to throw up the soil from, or to the fruit trees, to level between fruit trees, and to cultivate corn, potatoes, &c.; and, second, to afford facilities for the proper adjustment of the two lines or sections of disks, and for easy removal of any of the central disks from the machine, to suit the various necessities of different soils, cereals and vegetables. I attain these objects by the mechanism illustrated in the accompanying drawings, in which—

Figure 1, is an elevation of the machine, having its front part, almost to its center, broken away in order to show the interior arrangement of the operating parts, and the attached hangers bolted to the frame the ends of which are sectioned, also the ground wheel shafts with their adjusting levers, and the levers which operate the disks to different angles. Fig. 2, is a plan of the machine, showing how the double disks are adjusted to different angles, by means of said levers and their connections; and Fig. 3, is an enlarged sectional end elevation of the frame, showing the rigid disk hangers or supports, with the disk bearings, and the series of upper and lower bent arms and stays.

Similar letters and figures refer to similar parts throughout the several views.

The frame A, is provided with ground wheels B, which run loose on their crank shafts C. These crank shafts are supported, and operate in the outer and inner bearings D, which are bolted securely to said frame. The inner ends of these shafts are supplied, each with a vertical lever E, which operates the said ground wheels conjointly, or independently, consequently the frame with disks is lowered, bodily, or at either end to suit the ground.

The two sections of disks H, are operated independently, each section in pairs, and each pair is suspended from the frame, and revolves on their bearings I. The upper part of each of these bearings, admits a vertical tube J, which is cast therein, or otherwise secured. The upper part of the tube passes through the rigid hanger and support K, and through the frame, and held in position by means of a horizontal pin 3, in close proximity to the upper side of frame, thus allowing the said tubes to rotate with the lower bearing I.

On account of the lower part of the tubes, J, being cast in and to the upper shank ends of the bearings, I, below the broken lines X, X, which are the dividing lines between the hangers or standards K, and said shanks, prevents the said shank bearings with their lower caps and disks from slipping off said hangers or standards K, and the tubes J, when a pair of disks pass over a decided depression in the ground.

The aforesaid levers E, are each supplied with a common catch, or dog, to engage with the segmental ratchet F, which forms the upper part of inner bearings D; by means of this mechanism the frame is retained in adjusted position.

To adjust the pairs of disks to suitable angles when harrowing, the lever, or levers L, are operated, being pivoted at N, to the lower part of the segmental ratchet T, which is bolted to upper side of frame, said levers being supplied with dogs similar to levers E, for retaining purposes.

Attached to each lever L, is a connecting rod O, the inner end of which is connected to the horizontal bar P, to which is connected the series of bent arms S, the outer ends of which are connected to the upper ends of the said vertical tubes J, which when the levers L, are operated as described, the disks with their bearings I, are adjusted to any desired angle.

The series of lower bent arms S', the upper ends of which are connected to the under side of the said horizontal bars P, and their lower ends to the inner projections on the under caps and disk bearings I, as delineated in Fig. 3 of the drawings, are for the same purpose as the upper arms S, namely, to turn the disk bearings, with disks to any angle, and in addition, to act as side braces to the rigid hangers K, which are joined to the lower bearings I at the line X. These upper and lower connecting arms and braces S, and S', may operate in combination, as shown, or the upper ones S, may be removed for economical purposes if so desired, the disks could be operated as described without them. The said vertical tubes J, partially incased in hangers K, are also intended for the admittance of oil down their central apertures, to the disk shafts or bearings, this oiling element being very important.

It will be observed that when operating either section of disks at a certain angle, one disk of each pair, is forward throughout, also the removal of any two disks independent of the remainder, is a very important element in my improvements.

The draft tongue U, is allowed a certain swivel on its pivot pin 2, of its support braces V, which are bolted to the front of the frame.

It is not absolutely essential or necessary in every case of harrowing, to employ, or to have the two ground wheels attached to the machine, therefore the said wheels in some cases could be dispensed with, consequently the operating or adjusting mechanism relating thereto, and which comprises the bearings D, crank shafts C, segmental ratchets F, and the levers E, could all be removed when necessary.

The series of disks in each section are not confined to number, as delineated, but may have more or less pairs, according to size and requirements of machine.

What I claim as my invention, and desire to secure by Letters Patent, is—

1. The combination with the frame A, of the levers L, pivoted at N, of the ratchets T, the connecting rods O, horizontal bars P, hangers K, tubes J, with their pins 3, bearings I having under caps, and the bent arms S', substantially as described and set forth.

2. The combination in a disk harrow machine of the frame having bearings D, crank shafts C, wheels B, levers E and L, ratchets F and T, horizontal bars P, connecting rods O, hangers K, tubes J, having pins 3, bearings I having under caps, disks H, and the under bent arms S' substantially as described and set forth.

HERVEY TALLMAN.

Witnesses:
F. W. WHITE,
A. E. HOSHAL.